US009103092B2

(12) United States Patent
Ueda

(10) Patent No.: US 9,103,092 B2
(45) Date of Patent: Aug. 11, 2015

(54) HYBRID CONSTRUCTION MACHINE

(75) Inventor: Koji Ueda, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/000,288

(22) PCT Filed: Feb. 9, 2012

(86) PCT No.: PCT/JP2012/000853
§ 371 (c)(1),
(2), (4) Date: Aug. 19, 2013

(87) PCT Pub. No.: WO2012/111282
PCT Pub. Date: Aug. 23, 2012

(65) Prior Publication Data
US 2014/0000975 A1 Jan. 2, 2014

(30) Foreign Application Priority Data

Feb. 18, 2011 (JP) ................................. 2011-033224

(51) Int. Cl.
*B60R 3/00* (2006.01)
*E02F 9/08* (2006.01)
(Continued)

(52) U.S. Cl.
CPC .............. *E02F 9/0858* (2013.01); *B60L 1/003* (2013.01); *B60L 11/14* (2013.01); *E02F 9/006* (2013.01); *E02F 9/0808* (2013.01);
(Continued)

(58) Field of Classification Search
CPC ................................. B60R 3/00; B60R 3/005

USPC ......... 180/65.21, 65.22, 291; 280/163, 164.1, 280/165, 166, 169; 182/20, 35, 127; 105/443, 449, 450
See application file for complete search history.

(56) References Cited

U.S. PATENT DOCUMENTS 1,427,588 A * 8/1922 Greenison ....................... 182/21
6,756,693 B2 * 6/2004 Kennedy ....................... 290/1 A
(Continued)

FOREIGN PATENT DOCUMENTS

CN          1904235 A       1/2007
CN          101307611 A     11/2008
(Continued)

OTHER PUBLICATIONS

International Search Report Issued May 15, 2012 in PCT/JP12/000853 Filed Feb. 9, 2012.
(Continued)

*Primary Examiner* — J. Allen Shriver, II
*Assistant Examiner* — Travis Coolman
(74) *Attorney, Agent, or Firm* — Oblon, McClelland, Maier & Neustadt, L.L.P.

(57) ABSTRACT

A electric storage device and a controller are disposed efficiently without obstructing ventilation, with a vehicle size equivalent to that of a normal shovel. A hybrid construction machine includes a device case which internally accommodates an electric storage device and a controller, and the device case is provided in a space above an upper frame, in a front portion of the upper frame and on the opposite side of two vertical plates from the cabin, and constitutes up-and-down steps which are formed in a rearward-ascending step shape so as to be able to be ascended and descended.

9 Claims, 7 Drawing Sheets

(51) Int. Cl.
  *E02F 9/00*    (2006.01)
  *B60L 1/00*    (2006.01)
  *B60L 11/14*   (2006.01)

(52) U.S. Cl.
  CPC .......... *E02F 9/0833* (2013.01); *B60L 2200/42* (2013.01); *Y02T 10/70* (2013.01); *Y02T 10/7077* (2013.01)

(56) References Cited

U.S. PATENT DOCUMENTS

| | | | |
|---|---|---|---|
| 6,971,657 B2 * | 12/2005 | King et al. | 280/163 |
| 7,388,301 B2 * | 6/2008 | Komiyama et al. | 290/40 C |
| 7,722,066 B2 * | 5/2010 | O'Bireck et al. | 280/164.1 |
| 8,037,963 B2 * | 10/2011 | Nishimura et al. | 180/291 |
| 8,403,099 B2 * | 3/2013 | Yokota | 180/309 |
| 8,639,404 B2 * | 1/2014 | Sugiyama et al. | 701/22 |
| 2007/0090650 A1 | 4/2007 | Komiyama et al. | |
| 2008/0034621 A1 * | 2/2008 | Taniuchi et al. | 37/379 |
| 2009/0199553 A1 | 8/2009 | Nishimura et al. | |

FOREIGN PATENT DOCUMENTS

| | | |
|---|---|---|
| CN | 101501278 A | 8/2009 |
| JP | 2005-290727 A | 10/2005 |
| JP | 2007 107230 | 4/2007 |
| JP | 2008 015798 | 2/2008 |
| JP | 2010-47975 A | 3/2010 |
| JP | 2010 203160 | 9/2010 |
| JP | 2011 20833 | 2/2011 |
| JP | 2011 21432 | 2/2011 |

OTHER PUBLICATIONS

Combined Chinese Office Action and Search Report issued Feb. 2, 2015 in Patent Application No. 201280009303.9 (with English Summary and English Translation of Category of Cited Documents).

* cited by examiner

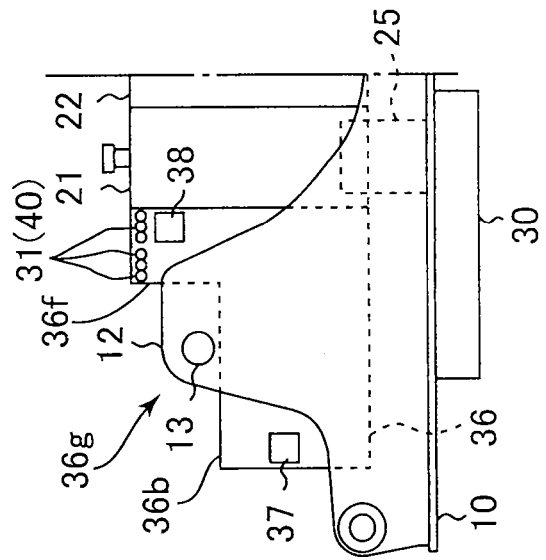
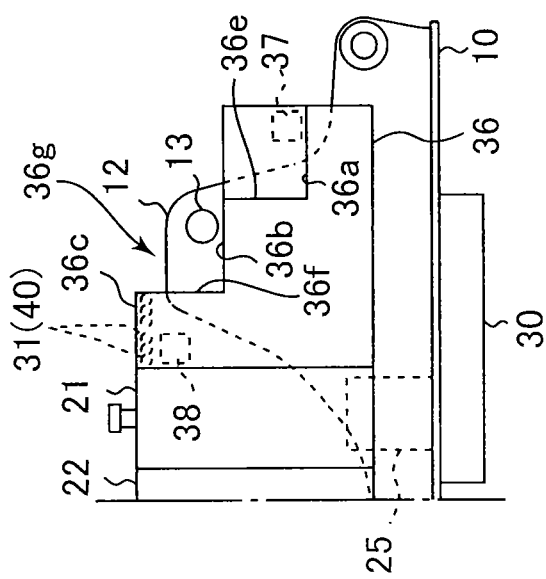

HYBRID CONSTRUCTION MACHINE

TECHNICAL FIELD

The present invention relates to a hybrid construction machine, such as a hybrid shovel, having an improved layout of a electric storage device and a controller, which are hybrid devices.

BACKGROUND ART

The background art is described below by taking a shovel as an example.

As shown in FIG. 6, the shovel includes: a lower propelling body 1 of a crawler type, an upper slewing body 2 provided on the lower propelling body 1 so as to be able to slew about a vertical axis with respect to the ground surface; a work attachment 9 which is installed on a front portion of this upper slewing body 2 by means of a boom foot pin 13; and a control valve 28 (see FIG. 9) which controls driving of the work attachment 9. The work attachment 9 includes a boom 3, an arm 4, a bucket 5, and hydraulic cylinders (namely, a boom cylinder, an arm cylinder and a bucket cylinder) 6, 7, 8 which operate the boom, arm and bucket, respectively.

As shown in FIG. 6 and FIG. 7, the upper slewing body 2 includes an upper frame 10 forming a base platform, and a left and right pair of vertical plates 11, 12 which are provided in an intermediate portion of the upper frame 10 in the left/right direction. The vertical plates 11, 12 are disposed at an interval apart in the left/right direction, and are also provided through substantially the whole length of the upper frame 10 in the front/rear direction.

As shown in FIG. 8, the front portions of each of the vertical plates 11, 12 project upwards in a shape of mountain. The boom foot pin 13 is provided at the front portions of the vertical plates 11, 12, so as to pass horizontally through the vertical plates 11, 12 in the left/right direction. The base end portion of the boom 3 is installed rotatably with respect to the vertical plates 11, 12 by means of the boom foot pin 13. Consequently, the boom 3 (the whole of the work attachment 9) can be raised and lowered about the boom foot pin 13.

As shown in FIG. 7, an engine compartment 15 of which the upper surface is opened and closed by a maintenance bonnet 14 is provided in a rear portion of the upper frame 10. An engine 16, which is a motive power source, and peripheral equipment of the engine (a radiator 17, a cooling fan 18, a hydraulic pump 19, etc.) are disposed in this engine compartment 15.

On the other hand, a cabin 20 is disposed in the space above the upper frame 10, to one side in left/right direction with respect to both vertical plates 11, 12, and to the forward side of the engine compartment 15 (in general, the cabin 20 is disposed to the left-hand side of the vertical plates 11, 12, hereinafter this case is described), and furthermore, a fuel tank 21 and a hydraulic oil tank 22 are arranged in a front/rear direction, to the other side in left/right direction with respect to both vertical plates 11, 12. Moreover, up-and-down steps 23 which enable a worker carrying out maintenance tasks to ascend to and descend from the bonnet 14 (and the devices inside the engine compartment 15) are provided in the space above the upper frame 10, to the forward side of the fuel tank 21 (the right front portion of the upper frame 10). The up-and-down steps 23 are formed in the shape of rearward-ascending steps having a hollow center.

In this specification "front/rear" and "left/right" indicates directions from the perspective of an operator seated in the cabin 20.

Furthermore, FIG. 7 and FIG. 8 show views with the work attachment 9 removed.

FIG. 9 shows a block composition of a drive system and a control system when the shovel is constituted as a hybrid system.

The hybrid shovel has hybrid devices, in addition to the basic composition of the shovel described above. More specifically, the hybrid devices includes: a motor-generator 24 which is capable of operating as an electric generator and an electric motor, a slewing electric motor 25 which is a slewing drive source, a electric storage device 26, such as a secondary cell, a controller 27 which controls these elements, and a mechatronic controller 35 which controls the control valve 28 in coordination with the controller 27.

The motor-generator 24 is driven by the engine 16. More specifically, as shown in FIG. 7, the motor-generator 24 is arranged with respect to the hydraulic pump 19 and connected to the engine 16.

The hydraulic actuator 29 shown in FIG. 9 includes the hydraulic cylinders 6 to 8 described above and left/right propelling hydraulic motors (not illustrated). This hydraulic actuator 29 is driven by supplying hydraulic oil discharged from the hydraulic pump 19, via the control valve 28. A control valve 28 is provided respectively for each actuator, but in FIG. 9, the control valves 28 are depicted as a set of a plurality of control valves.

The slewing electric motor 25 is provided so as to face a slewing bearing 30 shown in FIG. 6 (see FIG. 7), and causes the upper slewing body 2 to slew by driving a slewing gear (not illustrated).

The electric storage device 26 is respectively connected to the motor-generator 24 and the slewing electric motor 25 by a plurality of electric power cables 31 which are indicated by the bold lines in FIG. 9.

The controller 27 executes the various control required in the hybrid shovel. More specifically, the controller 27 controls switching of the motor-generator 24 between operation as an electric generator and operation as an electric motor, as well as controlling the electric power generated by the motor-generator 24, the current supplied to the motor-generator 24, the torque of the motor-generator 24, charging and discharging of the electric storage device 26 in accordance with excessive shortfall in the generator output of the motor-generator 24, and driving/halting of the slewing electric motor 25, and the like.

Furthermore, the controller 27 includes an inverter 33 and a hybrid controller 34 connected to the inverter 33. The inverter 33 is respectively connected to the motor-generator 24 and the slewing electric motor 25 by signal cables 32, which are represented by dotted lines in the drawings.

The electric storage device 26 is connected directly to the hybrid controller 34.

The mechatronic controller 35 controls the control valves 28 in coordination with the hybrid controller 34, and in accordance with operation of an operation lever (not illustrated), or the like.

In this hybrid shovel, if the power required of the hydraulic pump 19 is great, then the engine output is supplemented by operating the motor-generator 24 as an electric motor by the charged electric power of the electric storage device 26. On the other hand, if the power required of the hydraulic pump 19 is small, then the electric power generated by the motor-generator 24 is accumulated in the electric storage device 26. Consequently, an energy-saving operation which is an essential feature of the hybrid system is performed.

Conventionally, among the hybrid devices which are mounted in a hybrid type shovel of this kind, the electric storage device 26 and the controller 27 (inverter 33, hybrid controller 34) are often arranged in the engine compartment 15 (see Patent Documents 1 and 2, for example). Alternatively, the electric storage device 26 and the controller 27 may be arranged in a distributed fashion in a plurality of locations on the upper frame using the free space.

However, due to strong demand for size reduction in shovels, there is no spare margin for free space in shovels. Consequently, arranging the hybrid devices in addition to the basic constituent elements of the shovel with a vehicle size that is equivalent to a normal shovel is extremely difficult, regardless of whether a concentrated arrangement or a distributed arrangement is adopted.

Furthermore, if the electric storage device 26 and the controller 27 are arranged forcibly in concentrated fashion in the engine compartment 15, then this obstructs the flow of air to the radiator 17, and/or gives rise to massive generation of heat by the electric storage device 26 and the controller 27. On the other hand, if the electric storage device 26 and the controller 27 are arranged in distributed fashion, then this presents an impediment in that it makes assembly and maintenance of the machinery more troublesome.

Patent Document 1: Japanese Unexamined Patent Publication No. 2007-107230
Patent Document 2: WO 2008/015798

SUMMARY OF THE INVENTION

It is an object of the present invention to provide a hybrid construction machine in which an electric storage device and a controller can be disposed efficiently without obstructing ventilation, with a vehicle size equivalent to that of a normal shovel.

In order to resolve the problems described above, the present invention provides a hybrid construction machine, including: a lower propelling body; an upper frame which is provided so as to be able to slew on the lower propelling body; an engine compartment which is provided in a rear portion of the upper frame; a left and right pair of vertical plates which extend in a front/rear direction in an intermediate portion in a left/right direction of the upper frame; a cabin which is provided in a space above the upper frame at a position on an outside of the both vertical plates in the left/right direction; a work attachment having a base end section which is attached on a front portion of each of the vertical plates by a boom foot pin; a motor-generator capable of operating as an electric motor and an electric generator; an engine serving as a drive source for causing the motor-generator to operate as an electric generator; an electric storage device which constitutes a power source for causing the motor-generator to operate as an electric motor, and which is charged by the motor-generator operating as an electric generator; a slewing electric motor which drives the upper frame to slew by using the electric storage device as a power source; a controller which controls operation of the motor-generator, the slewing electric motor and the electric storage device; and a device case which internally accommodates the electric storage device and the controller, wherein the device case is provided in a space above the upper frame, in a front portion of the upper frame and on an opposite side of the both vertical plates from the cabin, and constitutes up-and-down steps which are formed in a rearward-ascending step shape so as to be able to be ascended and descended.

According to the present invention, it is possible to dispose an electric storage device and a controller efficiently without obstructing ventilation, with a vehicle size equivalent to that of a normal shovel.

BRIEF DESCRIPTION OF THE DRAWINGS

FIG. 2A is a side view when viewed in the direction of arrow A in FIG. 1 and FIG. 2B is a side view when viewed in the direction of arrow B in FIG. 1.

MODE FOR CARRYING OUT THE INVENTION

Below, an embodiment of the present invention is described with reference to the accompanying drawings. The embodiment described below is one example of a concrete embodiment of the present invention, and is not intended to limit the technical scope of the present invention.

In this embodiment, the invention is applied to a hybrid shovel.

The hybrid shovel relating to the present embodiment includes the same composition as the conventional technology shown in FIG. 6 to FIG. 9. A hybrid shovel relating to an embodiment of the invention is described below with reference to FIG. 1 to FIG. 9.

Figure 6:
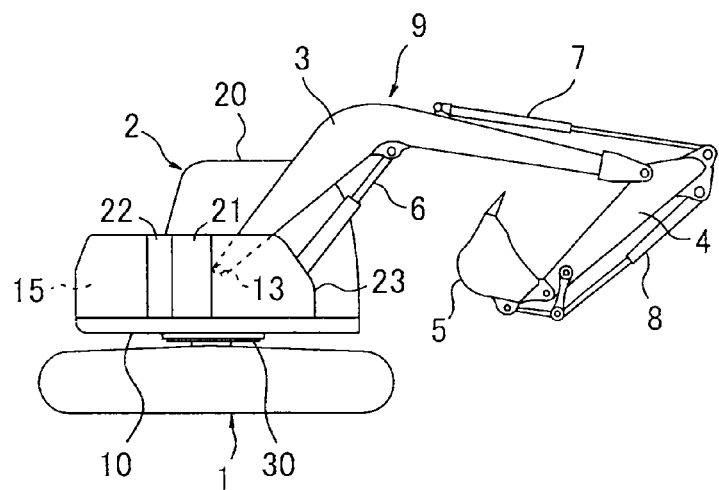
FIG. 6 is a schematic side view of a shovel for describing the related art.

More specifically, as shown in FIG. 6, a hybrid shovel includes: a lower propelling body 1 of a crawler type, an upper slewing body 2 provided on the lower propelling body 1 so as to be able to slew about a vertical axis with respect to the ground surface; a work attachment 9 having a base end section which is attached on a front portion of this upper slewing body 2 by means of a boom foot pin 13; a control valve 28 (see FIG. 9) which controls driving of the work attachment 9, and hybrid devices.

As shown in FIG. 6, the work attachment 9 includes a boom 3 having a base end section which is supported rotatably with respect to the upper slewing body 2, an arm 4 having a base end section which is attached rotatably with respect to the front end section of the boom 3, and a bucket 5 which is attached rotatably with respect to the front end section of the arm 4. Furthermore, the work attachment 9 includes a boom cylinder 6 which raises and lowers the boom 3, an arm cylinder 7 which rotates the arm 4, and a bucket cylinder 8 which rotates the bucket 5.

Figure 7:
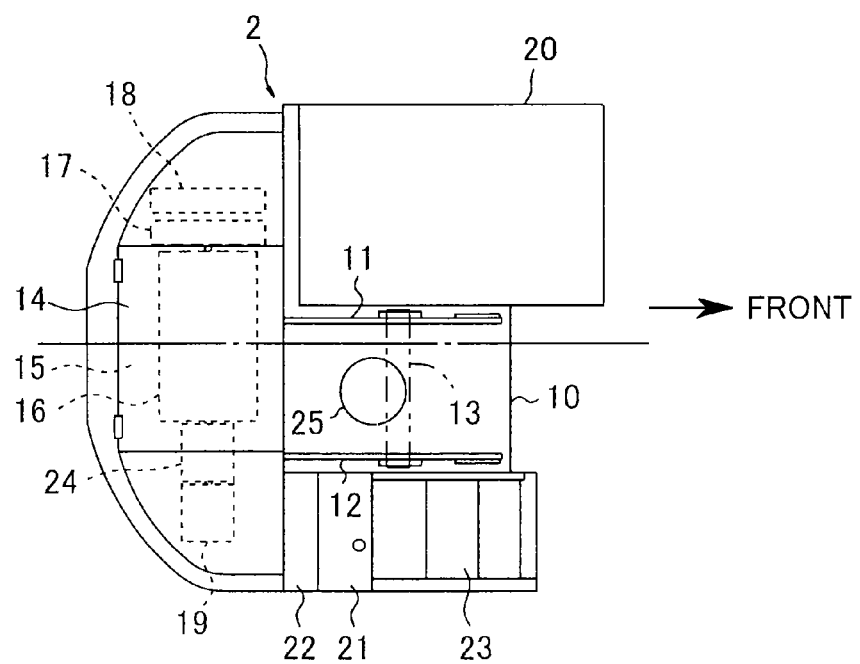
FIG. 7 is a schematic plan view of a conventional shovel.

As shown in FIG. 6 and FIG. 7, the upper slewing body 2 includes an upper frame 10 forming a platform which is provided so as to be able to slew on a lower propelling body 1, an engine compartment 15 which is provided to the rear portion of the upper frame 10, a left and right pair of vertical plates 11, 12 which extend in the front/rear direction in an intermediate portion of the upper frame 10 in the left/right direction, a cabin 20, an engine 16, peripheral devices of the engine (a radiator 17, a cooling fan 18, a hydraulic pump 19, etc.), a fuel tank 21, and a hydraulic oil tank 22 which are provided on the upper frame 10. Moreover, as described in detail hereinafter, the upper slewing body 2 relating to the present embodiment includes a device case 36 as shown in FIG. 1 to FIG. 5.

Figure 1:
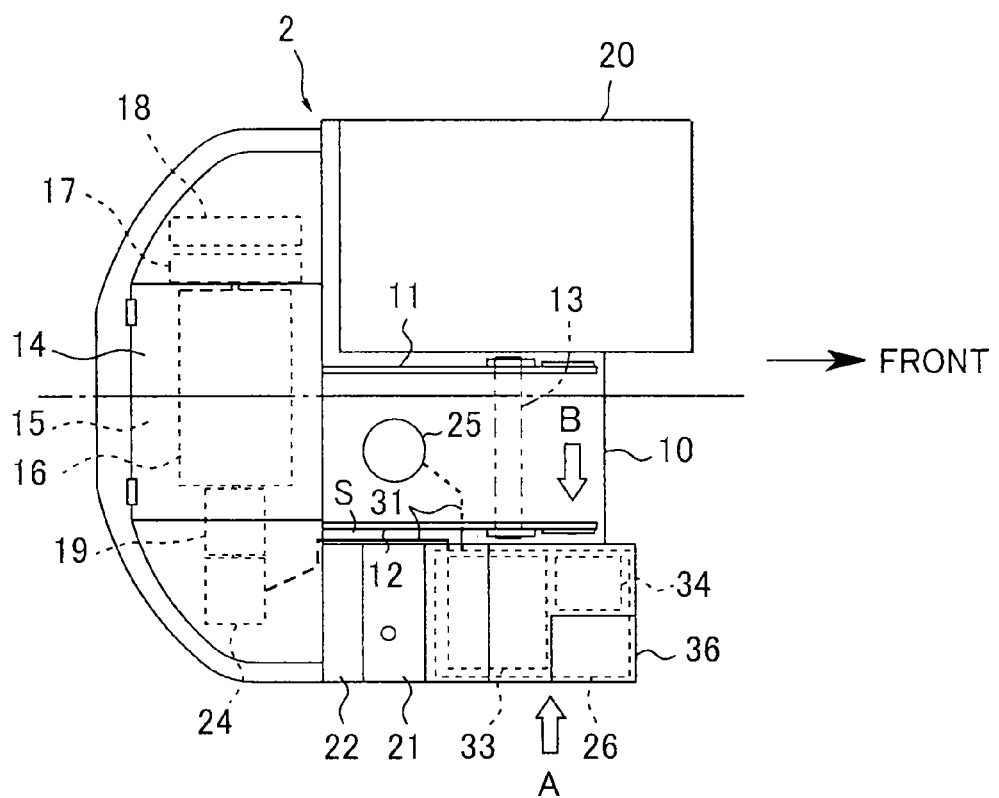
FIG. 1 is a schematic plan view of a shovel relating to an embodiment of the present invention.
Figure 3:
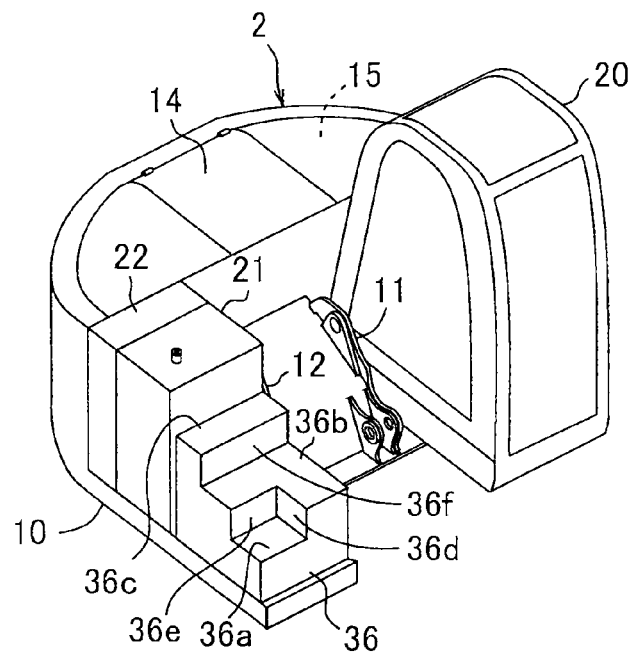
FIG. 3 is a schematic perspective view of a shovel relating to an embodiment of the invention.

The upper surface of the engine compartment 15 can be opened and closed by the maintenance bonnet 14, as shown in FIG. 1.

The vertical plates 11, 12 are disposed at an interval apart in the left/right direction, and are also provided through substantially the whole length of the upper frame 10 in the front/rear direction. As shown in FIG. 2, the front portions of each of the vertical plates 11, 12 project upwards in a shape of mountain. The boom foot pin 13 is provided at the front portions of the vertical plates 11, 12, so as to pass horizontally through the vertical plates 11, 12 in the left/right direction. The base end portion of the boom 3 is attached rotatably with respect to the vertical plates 11, 12 by means of the boom foot pin 13. Consequently, the boom 3 (the whole of the work attachment 9) can be raised and lowered about the boom foot pin 13.

As shown in FIG. 1, the cabin 20 is provided in the space above the upper frame 10, in a position on an outside of the both vertical plates 11, 12 in the left/right direction (in a position to the left-hand side of the vertical plates 11, 12 in the present embodiment). Furthermore, a cabin 20 is provided to the front of the engine compartment 15.

The engine 16, the radiator 17, the cooling fan 18 and the hydraulic pump 19 are provided inside the engine compartment 15.

The fuel tank 21 and the hydraulic oil tank 22 are arranged in a front/rear direction on the right-hand side of the vertical plates 11, 12. More specifically, the fuel tank 21 is arranged in front of the hydraulic oil tank 22 and to the rear of the device case 36, which is described below.

Figure 9:
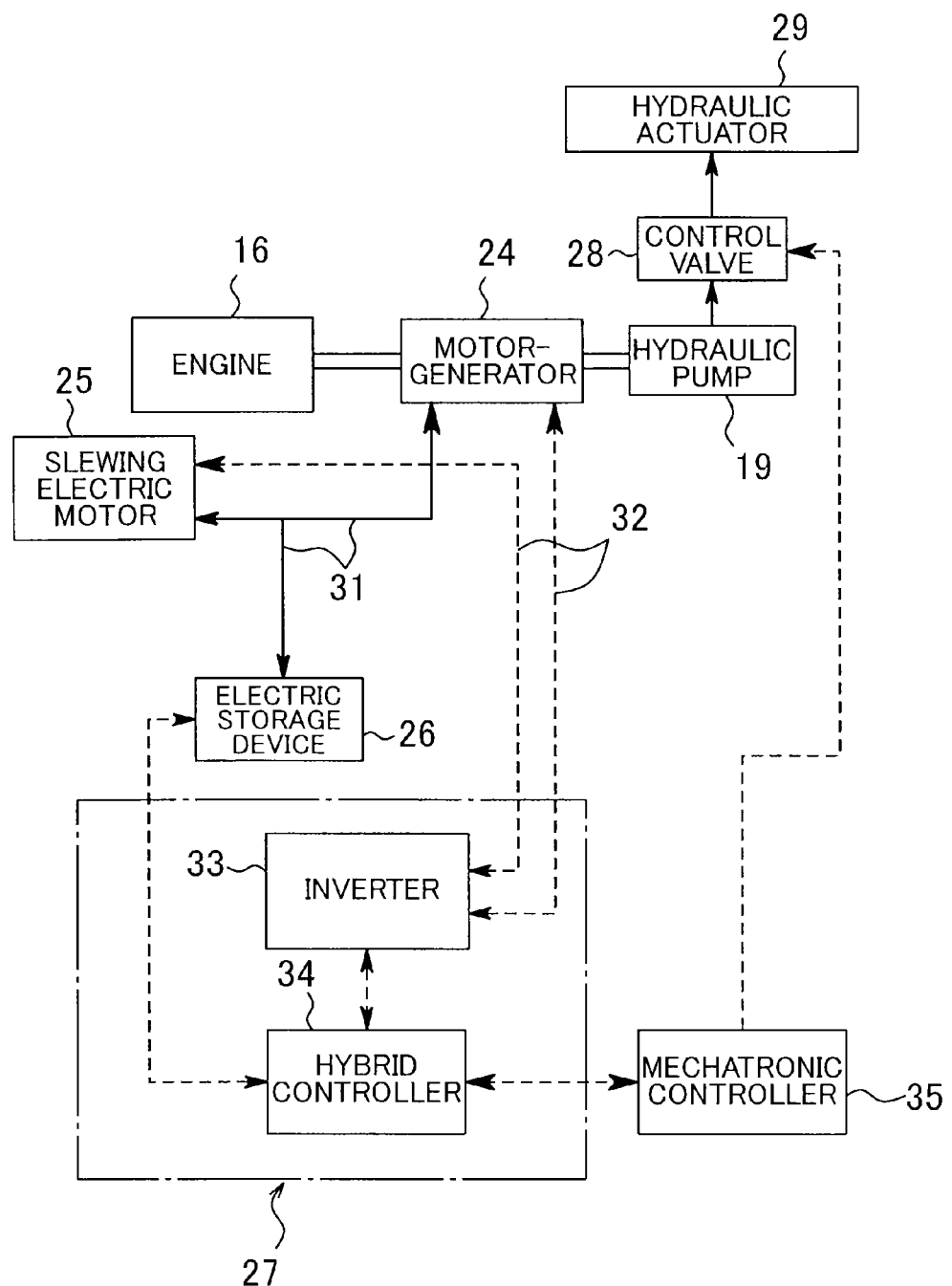
FIG. 9 is a block diagram showing a system composition of a hybrid shovel.

As shown in FIG. 9, the hybrid devices include: a motor-generator 24 which is capable of operating as an electric generator or an electric motor; a slewing electric motor 25 which causes the upper slewing body 2 to slew; an electric storage device 26 such as a secondary cell; a controller 27 which controls the operation of the motor-generator 24, the slewing electric motor 25 and the electric storage device 26; and a mechatronic controller 35 which controls the control valve 28 in coordination with the controller 27.

The motor-generator 24 can operate as an electric generator by using the engine 16 as a drive source. More specifically, as shown in FIG. 1 the motor-generator 24 is arranged with respect to the hydraulic pump 19 and connected to the engine 16.

The slewing electric motor 25 drives the upper frame 10 (upper slewing body 2) to slew by using the electric storage device 26 as a power source. More specifically, the slewing electric motor 25 is provided so as to face a slewing bearing 30 shown in FIG. 2, and causes the upper slewing body 2 to slew by driving a slewing gear (not illustrated).

The electric storage device 26 constitutes a power source for causing the motor-generator 24 to operate as an electric motor, as well as being charged by the motor-generator 24 operating as an electric generator. More specifically, the electric storage device 26 is respectively connected to the motor-generator 24 and the slewing electric motor 25 by a plurality of electric power cables 31 which are indicated by the bold lines in FIG. 9.

The controller 27 executes the various control required in the hybrid shovel. More specifically, the controller 27 controls switching of the motor-generator 24 between operation as an electric generator and operation as an electric motor, as well as controlling the electric power generated by the motor-generator 24, the current supplied to the motor-generator 24, the torque of the motor-generator 24, charging and discharging of the electric storage device 26 in accordance with excessive shortfall in the generator output of the motor-generator 24, and driving/halting of the slewing electric motor 25, and the like.

Moreover, the controller 27 includes a inverter 33 which controls operation of the motor-generator 24 and the slewing electric motor 25, and a hybrid controller 34 which outputs a control command (a charge or discharge command for the electric storage device 26, or the like) to the inverter 33 and the electric storage device 26. The inverter 33 is respectively connected to the motor-generator 24 and the slewing electric motor 25 by signal cables 32, which are represented by dotted lines in FIG. 9. The hybrid controller 34 is connected electrically to the electric storage device 26 and the inverter 33.

The mechatronic controller 35 controls the control valve 28 in coordination with the hybrid controller 34, and in accordance with operation of an operation lever (not illustrated), or the like.

The hydraulic actuator 29 shown in FIG. 9 includes the hydraulic cylinders 6 to 8 described above and a left/right propelling hydraulic motors (not illustrated). This hydraulic actuator 29 is driven by supplying hydraulic oil discharged from the hydraulic pump 19, via the control valve 28. A control valve 28 is provided respectively for each actuator, but in FIG. 9, the control valves 28 are depicted as a set of a plurality of control valves.

Below, a device case 36 is described with reference to FIG. 1 to FIG. 5.

The device case 36 stores the electric storage device 26 and the controller 27 (the inverter 33 and the hybrid controller 34) in a concentrated fashion. This device case 36 is provided in a space above the upper frame 10, on the opposite side of the both vertical plates 11, 12 from the cabin 20 (on the right-hand side of the vertical plates 11, 12 in the present embodiment) and to the front portion of the upper frame 10. More specifically, the device case 36 is provided in front of the fuel tank 21.

Moreover, the device case 36 constitutes up-and-down steps which are formed in a backward-ascending step shape in such a manner a worker carrying out maintenance can ascend to and descend from the bonnet 14 (the devices inside the engine compartment 15). More specifically, the device case 36 is formed from a panel material, as shown in FIG. 2 to FIG. 5.

More specifically, the device case 36 is a box having three steps. In other words, the device case 36 includes: a first step surface 36a which is a bottommost step; a second step surface 36b which is arranged one step above the first step surface 36a, to the rear and to the left-hand side thereof; and a third step surface 36c which is an uppermost step arranged one step above the second step surface 36b, to the rear thereof 36d indicates a first right-side surface which faces rightwards between the first step surface 36a and the second step surface 36b; 36e indicates a first front side surface which faces forwards between the first step surface 36a and the second step surface 36b; and 36f indicates a second front side surface which faces forwards between the second step surface 36b and the third step surface 36c.

In FIG. 1, in order to avoid complication of the drawings, the reference numerals of the step surfaces 36a, 36b and 36c are omitted.

The device case 36 accommodates the electric storage device 26, the inverter 33 and the hybrid controller 34, which are layered in a step shape corresponding to the device case 36 in such a manner that the electric storage device 26 forms the bottommost layer. In other words, the electric storage device 26, the inverter 33 and the hybrid controller 34 are arranged inside the device case 36 in a state that electric storage device 26, the inverter 33 and the hybrid controller 34 are layered in a step shape corresponding to the device case 36.

Figure 4:
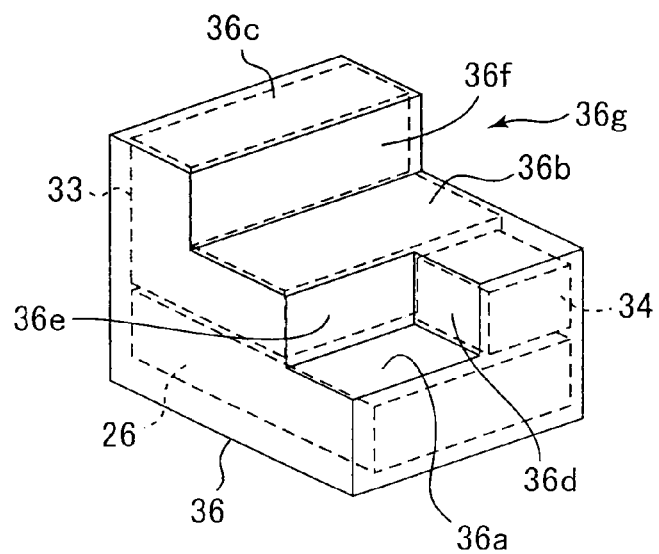
FIG. 4 is an assembly perspective view of up-and-down steps which are disposed on a shovel relating to an embodiment of the invention.
Figure 5:
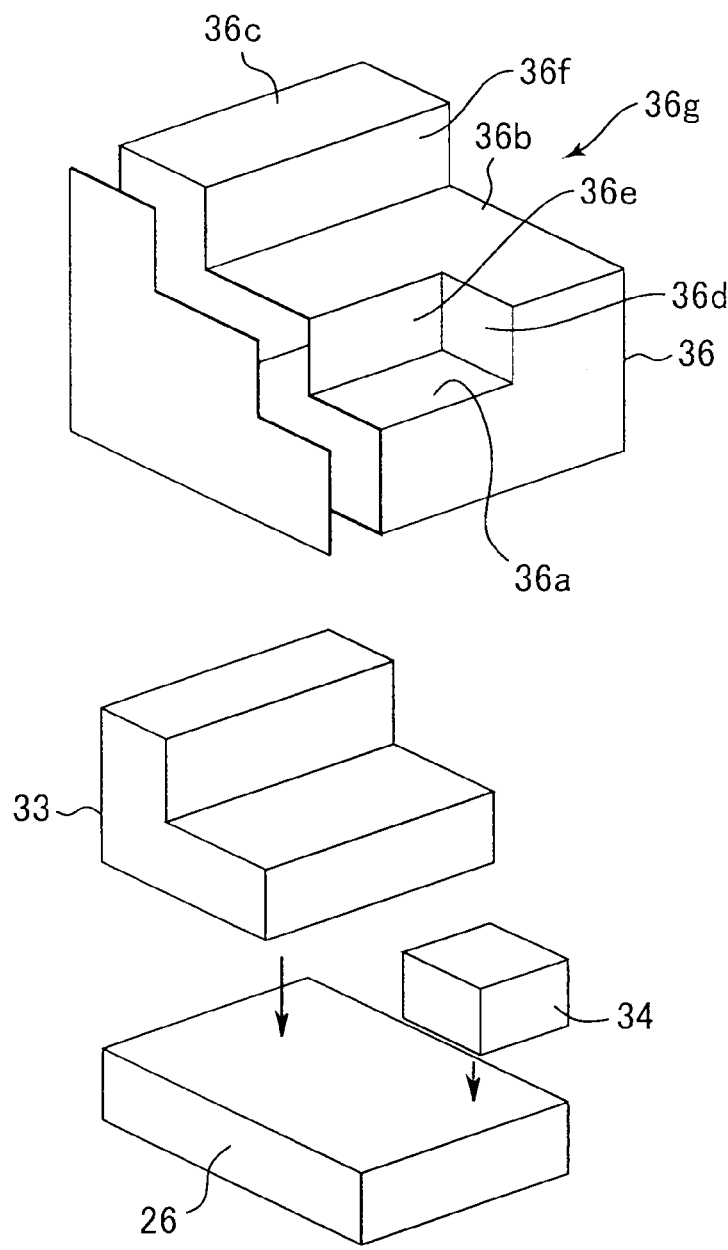
FIG. 5 is an exploded perspective view of the up-and-down steps shown in FIG. 4.

The electric storage device 26 is the heaviest element, of the electric storage device 26, the inverter 33 and the hybrid controller 34. The electric storage device 26 is arranged through substantially the whole interior of the device case 36, in the lower portion of the device case 36, as shown in FIG. 1, FIG. 4 and FIG. 5. More specifically, the electric storage device 26 occupies substantially the whole of the interior of the device case 36 in plan view, in a range below the first step surface 36a.

The hybrid controller 34 is arranged on the front left-hand side of the upper surface of the electric storage device 26. More specifically, the hybrid controller 34 is provided in a region below the second step surface 36b, to the left of the first right side surface 36d and to the front of the first front side surface 36e.

The inverter 33 is arranged to the rear of the hybrid controller 34 above the electric storage device 26. More specifically, the inverter 33 is provided in a range to the rear of the first front side surface 36e. Moreover, the inverter 33 is formed in a substantial L shape in side view, having an upper surface which is disposed below the second step surface 36b and the third step surface 36c and a front surface which is arranged to the rear of the second front side surface 36f.

In each of the drawings, the inverter 33 and the hybrid controller 34 are depicted as a clear box shape with an outline shape, in order to aid understanding of their shapes. The actual inverter 33 and hybrid controller 34 are a set of components which do not each have a distinct outline.

Figure 8:
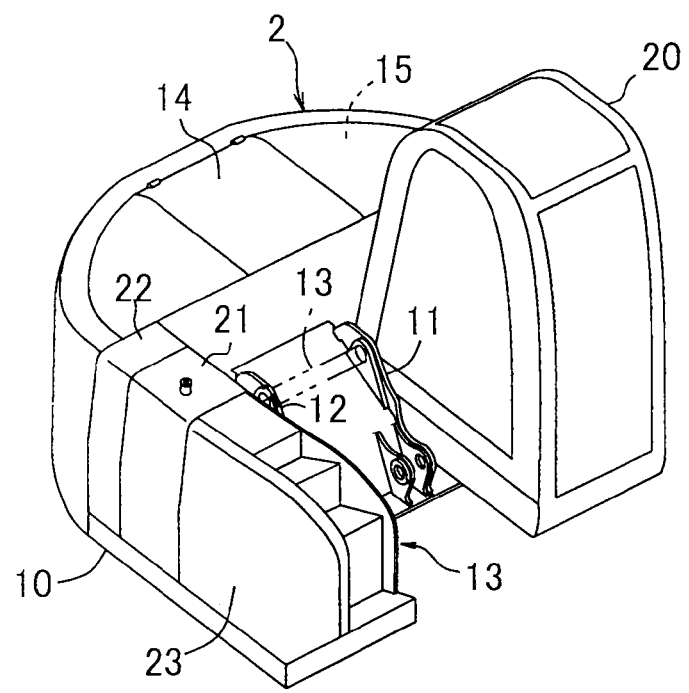
FIG. 8 is a schematic perspective view of a conventional shovel.

Here, the conventional up-and-down steps 23 for maintenance shown in FIG. 7 and FIG. 8 occupy a relatively large space and are not used efficiently. More specifically, the conventional up-and-down steps 23 have been used in order to store tools and the like.

Therefore, the present inventors, and the like, focused on this point and arrived at an invention in which the electric storage device 26 and the controller 27, of the hybrid devices, are stored in concentrated fashion in one step-shaped device case 36. Consequently, the electric storage device 26 and the controller 27 can be disposed efficiently, in other words without sacrificing the installation space and maintenance space of other devices, and simply with a vehicle size equivalent to that of a normal shovel.

Moreover, in the present embodiment, unlike cases where a electric storage device 26 and a controller 27 are arranged in the engine compartment 15, it is possible to avoid problems, such as inhibiting ventilation to the radiator 17 and/or giving rise to massive generation of heat by the devices themselves. Furthermore, in the present embodiment, since the electric storage device 26 and the controller 27 are disposed in a concentrated fashion inside the up-and-down steps (device case 36) which can be accessed readily from the exterior, then they become easier to maintain.

In order to ensure this ease of maintenance, it is also possible to provide an opening for maintenance in the right side surface and the upper surface of the device case 36. Moreover, it is also possible to provide a door for opening and closing the opening for maintenance, in the device case 36.

Furthermore, the electric storage device 26 and the controller 27 are stored in a concentrated fashion inside one device case 36. Consequently, it is possible to connect the electric storage device 26 and the controller 27 readily via the shortest distance, as well as being able to connect the electric storage device 26 and the controller 27 by using concealed wiring which is not exposed to the exterior.

In addition, it is possible to carry out dustproofing and waterproofing processes of the electric storage device 26 and the controller 27 simultaneously with respect to a single device case 36. Consequently, it is possible to carry out dustproofing and waterproofing processes readily and at low cost.

When the boom 3 is attached after assembly of the upper slewing body 2, or when the boom 3 is removed for the purpose of maintenance, or the like, after shipment, the cabin 20 is present on the left-hand side of the boom foot pin 13. Consequently, the boom foot pin 13 can only be inserted and removed from the opposite side to the cabin 20, in other words, the right-hand side.

In the present embodiment, the device case 36 is positioned on the right-hand side of the boom foot pin 13. Consequently, there is a possibility that the device case 36 will obstruct the insertion and removal of the boom foot pin 13.

Therefore, the device case 36 relating to the present embodiment has a shape which ensures a pin insertion and removal space that permits the boom foot pin 13 to be inserted and removed in the axial direction thereof, on the right-hand side of the vertical plates 11, 12, as shown in FIG. 2.

More specifically, a cutaway section 36g which is open on the front and upper sides is formed in the device case 36, in such a manner that the boom foot pin 13 is visible from a viewpoint on the opposite side of the device case 36 from the vertical plates 11, 12 (the viewpoint of FIG. 2). More specifically, the cutaway section 36g is delimited by the second step surface 36b and the second front side surface 36f. In other words, the upward surface which delimits the cutaway section 36g constitutes a foot support (second step surface 36b). Consequently, in the present embodiment, it is possible to insert and remove the boom foot pin 13 via the cutaway section 36g. Moreover, since the upward second step surface 36b which delimits the cutaway section 36g is used as a foot support, then it is possible to form a pin insertion and removal space while maintaining the same size of the device case 36.

Furthermore, according to the present embodiment, when inserting and removing the boom foot pin 13, for example, intermediate tasks, such as disassembling the device case 36 and the devices therein, and the like, are unnecessary. Consequently, the task of inserting and removing the boom foot pin, and hence the task of attaching and removing the boom 3, is easy to perform.

In the present embodiment, the motor-generator 24 is arranged on the right-hand side of the rear portion of the upper frame 10. Moreover, the slewing electric motor 25 is disposed between the vertical plates 11, 12, in plan view. The motor-generator 24 and the slewing electric motor 25, and the electric storage device 26 inside the device case 36 are connected by a plurality of electric power cables 31 as shown in FIG. 9.

In this embodiment, the electric power cables 31 are arranged as shown in FIG. 1 and FIG. 2. More specifically, the electric power cables 31 are arranged along a path passing through a gap-shaped space S (labeled in FIG. 1) which is formed between the left side surface of the device case 36 and the right side surface of the right-hand vertical plate 12. Furthermore, the electric power cables 31 are connected to an electric power cable (not illustrated) inside the device case 36.

In particular, in the present embodiment, the motor-generator 24 is arranged to the rear side of the device case 36. Therefore, the electric power cable 31 connecting the electric storage device 26 and the motor-generator 24 passes through the space S between the right side surface of the right-hand vertical plate 12 and the left side surface of the device case 36, and reaches the motor-generator 24.

In this way, a dead space, which is the space S between the right-hand vertical plate 12 and the device case 36 is used as a wiring path for the electric power cable 31. Consequently, modifications and additions to the upper frame 10 in order to ensure a new wiring path either become unnecessary or can be minimized.

Moreover, it is also possible to use the right-hand vertical plate 12 and the device case 36 as a guide for the electric power cables 31. By this means, it is possible to easily arrange the electric power cables 31 in a state where they are shielded from the exterior.

In particular, if electric power cables 31 are laid from the device case 36 to the motor-generator 24 which is arranged to the rear of the device case 36, then the electric power cables 31 can be guided through a longer distance by the right-hand vertical plate 12, compared to a case where the electric power cables 31 are laid to a device (for example, a slewing electric motor 25) which is arranged to the side of the device case 36.

Furthermore, as shown in FIG. 2, the connection position of the electric power cables 31 is set to the left side surface of the device case 36, at a position above the upper end of the right-hand vertical plate 12 (a position slightly below the third step surface 36c). In other words, the device case 36 has a connection section 40 (only depicted in FIG. 2) which can connect the electric power cables 31 above the upper end of the right-hand vertical plate 12.

Therefore, the electric power cables 31 can be connected to the device case 36 without being obstructed by the right-hand vertical plate 12. Therefore, the task of arranging the electric power cables 31 becomes easier to carry out.

Furthermore, the electric storage device 26 and the controller 27 generate heat. Therefore, in the present embodiment, the electric storage device 26 and the controller 27 in the device case 36 are cooled by a water cooling system.

More specifically, a cooling water pump and a hybrid device radiator (both not illustrated) are provided inside the engine compartment 15. The cooling water discharged by the cooling water pump is introduced into the device case 36 via the cooling water inlet pipe. The cooling water after cooling is returned to the cooling water pump from the device case 36 via the cooling water outlet pipe and via the radiator.

In order to achieve cooling of this kind, as shown in FIG. 2, the device case 36 includes a cooling water inlet 37 for introducing cooling water to the interior of the device case 36, and a cooling water outlet 38 for extracting the cooling water from the device case 36.

Here, the cooling water inlet 37 and the cooling water outlet 38 are provided on the left side surface of the device case 36 which faces the right-hand vertical plate 12, at positions removed from the right-hand vertical plate 12 when viewed from the side. Furthermore, the cooling water inlet 37 and the cooling water outlet 38 are arranged separately on the front portion and the rear portion of the device case 36, and the cooling water outlet 38 is arranged above the cooling water inlet 37. More specifically, the cooling water inlet 37 is provided in the front portion of the left side surface of the device case 36. Furthermore, the cooling water outlet 38 is provided in the rear portion of the left side surface of the device case 36.

By adopting a layout of this kind, the task of laying out the inlet pipe and outlet pipe to the cooling water inlet 37 and the cooling water outlet 38 and maintenance tasks relating to the cooling water inlet 37 and the cooling water outlet 38 can be carried out easily without being obstructed by the right-hand vertical plate 12.

Furthermore, the cooling water inlet 37 and the cooling water outlet 38 are arranged in separated fashion in the front/rear direction. Therefore, it is possible to connect the pipes with the cooling water inlet and the cooling water outlet, easily, without the inlet pipe and the output pipe interfering with each other. Moreover, by arranging the cooling water outlet 38 above the cooling water inlet 37, air can escape more readily from the cooling water path.

The cooling water pipes may be laid out on a path which passes through a gap between the right-hand vertical plate 12 and the device case 36, similarly to the electric power cables 31, or on a path which passes along a different path.

In this embodiment, the electric storage device 26, the inverter 33 and the hybrid controller 34 are accommodated in a device case 36, but the invention is not limited to this. For example, the mechatronic controller 35 shown in FIG. 9 may also be accommodated in the device case 36.

Furthermore, in the embodiment described above, the invention is applied to a shovel having a generic layout in which a cabin 20 is arranged on a front left side, but the invention is not limited to this. For example, the present invention can also be applied to a shovel in which a cabin 20 is arranged on a front right side.

In this case, the device case 36 which also serves as up-and-down steps is arranged on the front left side.

Moreover, the present invention is not limited to a shovel; for example, it can be applied to other hybrid construction machines, such as a dismantling machine or a breaker which incorporates a shovel as a parent body.

The concrete embodiment described above principally includes an invention having the following composition.

The present invention provides a hybrid construction machine, including: a lower propelling body; an upper frame which is provided so as to be able to slew on the lower propelling body; an engine compartment which is provided in a rear portion of the upper frame; a left and right pair of vertical plates which extend in a front/rear direction in an intermediate portion in a left/right direction of the upper frame; a cabin which is provided in a space above the upper frame at a position on an outside of the both vertical plates in the left/right direction; a work attachment having a base end section which is attached on a front portion of each of the vertical plates by a boom foot pin; a motor-generator capable of operating as an electric motor and an electric generator; an engine serving as a drive source for causing the motor-generator to operate as an electric generator; an electric storage device which constitutes a power source for causing the motor-generator to operate as an electric motor, and which is charged by the motor-generator operating as an electric generator; a slewing electric motor which drives the upper frame to slew by using the electric storage device as a power source; a controller which controls operation of the motor-generator, the slewing electric motor and the electric storage device; and a device case which internally accommodates the electric storage device and the controller, wherein the device case is provided in a space above the upper frame, in a front portion of the upper frame and on an opposite side of the both vertical plates from the cabin, and constitutes up-and-down steps which are formed in a rearward-ascending step shape so as to be able to be ascended and descended.

The present inventors, and others, arrived at the present invention by focusing on the fact that the up-and-down steps occupy a relatively large space but are not used efficiently. (The up-and-down steps are used only for accommodating tools or the like.) More specifically, in the present invention, a step-shaped device case which accommodates the electric storage device and the controller in a concentrated fashion constitutes up-and-down steps for maintenance which are disposed on the opposite side from the cabin, in the front portion of the upper frame. Consequently, it is possible to dispose the electric storage device and the controller efficiently, with a vehicle size equivalent to that of a normal shovel.

Moreover, in the present embodiment, unlike cases where a electric storage device and a controller are arranged in the engine compartment, it is possible to avoid problems, such as inhibiting ventilation to the radiator and/or giving rise to massive generation of heat by the electric storage device and the controller themselves. Furthermore, by accommodating the electric storage device and the controller in concentrated fashion, the installation of the electric storage device and the controller becomes easier and the electric storage device and the controller can be accessed readily from the exterior, thus facilitating maintenance.

Moreover, in the present invention, the electric storage device and the controller are accommodated in concentrated fashion inside one device case. Consequently, it is possible to connect the electric storage device and the controller readily via the shortest distance, as well as being able to connect the electric storage device and the controller by using concealed wiring which is not exposed to the exterior.

In addition, it is possible to carry out dustproofing and waterproofing processes of the electric storage device and the controller simultaneously with respect to a single device case. Consequently, it is possible to carry out the dustproofing and waterproofing processes readily and at low cost.

In the hybrid construction machine, desirably, the controller includes: an inverter which controls operation of the motor-generator and the slewing electric motor, and a hybrid controller which outputs control commands to the inverter and the electric storage device; and the device case accommodates the electric storage device, the inverter and the hybrid controller which are layered in a step shape corresponding to the device case, in such a manner that the electric storage device forms a bottom layer.

In this aspect, the electric storage device, the inverter and the hybrid controller are layered in a step shape so as to correspond to the device case. Therefore, it is possible to make maximum use of the space for providing the up-and-down steps (the space allowed for the device case). Moreover, in the aspect, the electric storage device, which is the heaviest and largest element among the electric storage device, the inverter and the hybrid controller, is arranged in the bottom layer. Therefore, it is possible to make efficient use of the space inside the device case, as well as achieving a low center of gravity and thus stabilizing the device case.

In the hybrid construction machine, desirably, the device case has a shape which ensures, on the opposite side of the vertical plates from the cabin in the left/right direction, a pin insertion and removal space by which the boom foot pin can be inserted and removed in an axial direction thereof.

When a boom is attached after assembly of the upper slewing body, or when a boom is removed for maintenance purposes after shipment of the construction machine, the cabin is present on one side of the boom foot pin in the left/right direction. Therefore, the insertion and removal of the boom foot pin can only be performed on the opposite side from the cabin, in other words, the side of the up-and-down steps.

Here, in the aspect, the device case has a shape which ensures a pin insertion and removal space that allows the boom foot pin to be inserted and removed in the axial direction thereof. Therefore, for instance, troublesome tasks such as disassembling the device case and the devices therein are not required when inserting or removing the boom foot pin.

Consequently, the task of inserting and removing the boom foot pin, and hence the task of installing and removing the boom, are easy to perform.

In the hybrid construction machine, desirably, in order to ensure the pin insertion and removal space, a cutaway section is formed in the device case, the cutaway section being open to a front side and an upper side in such a manner that the boom foot pin is visible from a viewpoint on an opposite side of the device case from the vertical plates; and an upward surface which delimits the cutaway section constitutes a foot support for ascending and descending.

In this aspect, a cutaway section which is open to the front and upper sides is formed in the device case in such a manner that the boom foot pin is visible from a viewpoint at the side. Consequently, it is possible to insert and remove the boom foot pin via the cutaway section. Moreover, in this aspect, since the upward surface which delimits the cutaway section can be used as a foot support, it is possible to form a pin insertion and removal space while maintaining the same size of the device case.

The hybrid construction machine, desirably, further includes electric power cables which connect the motor-generator and the slewing electric motor to the electric storage device; and the electric power cables are arranged along a path passing through a gap between the device case and an adjacent-side vertical plate, of the two vertical plates, which is on a side adjacent to the device case.

In this aspect, a dead space between the adjacent-side vertical plate and the device case is used as a wiring path for electric power cables which connect the motor-generator and the slewing electric motor to the electric storage device. Consequently, modifications and additions to the upper frame in order to ensure a new wiring path either become unnecessary or can be minimized. Moreover, the adjacent-side vertical plate and the device case can be used as guides for the electric power cables. By this means, it is possible to easily arrange the electric power cables in a state where they are shielded from the exterior.

The hybrid construction machine, desirably, further includes an electric power cable which connects the motor-generator and the electric storage device; the motor-generator is arranged to the rear of the device case; and the electric power cable is laid so as to pass through a gap between the device case and an adjacent-side vertical plate, of the two vertical plates, which is on a side adjacent to the device case, and so as to reach the motor-generator.

In this aspect, similarly to the aspects, modifications and additions to the upper frame in order to ensure a new wiring path either become unnecessary or can be minimized. Furthermore, in this aspect, the adjacent-side vertical plate which extends in the front/rear direction is used as a guide to lay electric power cables from the device case to the motor-generator which is arranged to the rear of the device case. Consequently, it is possible to guide the electric power cables through a longer range by the adjacent-side vertical plate, compared to a case where the electric power cables are laid to a device which is arranged to one side of the device case.

In the hybrid construction machine, desirably, the device case has a connecting section which can connect the electric power cable, above an upper end of the adjacent-side vertical plate.

According to this aspect of the invention, it is possible to connect electric power cables to the device case without being obstructed by the adjacent-side vertical plate. Therefore, the task of arranging the electric power cables becomes easier to carry out.

In the hybrid construction machine, desirably, the device case includes a cooling water inlet for introducing cooling water for cooling the electric storage device and the controller inside the device case, and a cooling water outlet for extracting the cooling water; and the cooling water inlet and the cooling water outlet are provided on a side surface of the device case which faces an adjacent-side vertical plate, of the two vertical plates, which is on a side adjacent to the device case, at positions distanced from the adjacent-side vertical plate when viewed from the side.

Since the electric storage device and the controller generate heat, then normally, they are cooled by a water-cooling system in order to maintain performance.

Here, in the aspect, the cooling water inlet and the cooling water outlet are provided on a side surface of the device case which faces the adjacent-side vertical plate, at a position distanced from the adjacent-side vertical plate when viewed from the side. Consequently, the task of laying out the inlet pipe and outlet pipe to the cooling water inlet and the cooling water outlet and maintenance tasks relating to the cooling water inlet and the cooling water outlet can be carried out easily without being obstructed by the adjacent-side vertical plate.

In the hybrid construction machine, desirably, the cooling water inlet and the cooling water outlet are arranged in separated fashion in a front portion and a rear portion of the device case; and the cooling water outlet is arranged at a higher position than the cooling water inlet.

In this aspect, it is possible to connect the pipes with the cooling water inlet and the cooling water outlet, easily, without the inlet pipe and the output pipe interfering with each other. Moreover, by arranging the cooling water outlet above the cooling water inlet, air can escape more readily from the cooling water path.

INDUSTRIAL APPLICABILITY

According to the present invention, it is possible to dispose an electric storage device and a controller efficiently without obstructing ventilation, with a vehicle size equivalent to that of a normal shovel.

EXPLANATION OF REFERENCE NUMERALS

S space
1 lower propelling body
9 work attachment
10 upper frame
11, 12 vertical plate
13 boom foot pin
15 engine compartment
16 engine
20 cabin
24 motor-generator
25 slewing electric motor
26 electric storage device
27 controller
31 electric power cable
33 inverter
34 hybrid controller
36 device case
36b second step surface (upward surface delimiting cutaway section)
36g cutaway section
37 cooling water inlet
38 cooling water outlet
40 connecting section

The invention claimed is:

1. A hybrid construction machine, comprising:
a lower propelling body;
an upper frame which is provided so as to be able to slew on the lower propelling body;
an engine compartment which is provided in a rear portion of the upper frame;
a left and right pair of vertical plates which extend in a front/rear direction in an intermediate portion in a left/right direction of the upper frame;
a cabin which is provided in a space above the upper frame at a position on an outside of the both vertical plates in the left/right direction;
a work attachment having a base end section which is attached on a front portion of each of the vertical plates by a boom foot pin;
a motor-generator capable of operating as an electric motor and an electric generator;
an engine serving as a drive source for causing the motor-generator to operate as an electric generator;
an electric storage device which constitutes a power source for causing the motor-generator to operate as an electric motor, and which is charged by the motor-generator operating as an electric generator;
a slewing electric motor which drives the upper frame to slew by using the electric storage device as a power source;
a controller which controls operation of the motor-generator, the slewing electric motor and the electric storage device; and
a device case which internally accommodates the electric storage device and the controller,
wherein the device case is provided in a space above the upper frame, in a front portion of the upper frame and on an opposite side of the both vertical plates from the cabin, and constitutes up-and-down steps which are formed in a rearward-ascending step shape so as to be able to be ascended and descended, wherein
the controller includes an inverter which controls operation of the motor-generator and the slewing electric motor, and a hybrid controller which outputs control commands to the inverter and the electric storage device,
the hybrid controller is arranged on the electric storage device and has an upper surface,
the inverter is arranged to the rear of the hybrid controller above the electric storage device and has an upper surface disposed at a position higher than the upper surface of the hybrid controller, and
the device case includes a first step surface, a second step surface arranged one step above the first step surface and provided above the upper surface of the hybrid controller, and a third step surface arranged one step above the second step surface and provided above the upper surface of the inverter.

2. The hybrid construction machine according to claim 1, wherein the device case has a shape which ensures, on the opposite side of the vertical plates from the cabin in the left/right direction, a pin insertion and removal space by which the boom foot pin can be inserted and removed in an axial direction thereof.

3. The hybrid construction machine according to claim 2, wherein the pin insertion and removal space is formed above the second step surface.

4. The hybrid construction machine according to claim 2, wherein, in order to ensure the pin insertion and removal space, a cutaway section is formed in the device case, the cutaway section being open to a front side and an upper side in such a manner that the boom foot pin is visible from a viewpoint on an opposite side of the device case from the vertical plates, and an upward surface which delimits the cutaway section constitutes a foot support for ascending and descending.

5. The hybrid construction machine according to claim 1, further comprising electric power cables which connect the motor-generator and the slewing electric motor to the electric storage device, wherein the electric power cables are arranged along a path passing through a gap between the device case and an adjacent-side vertical plate, of the two vertical plates, which is on a side adjacent to the device case.

6. The hybrid construction machine according to claim 5, wherein the device case has a connecting section which can connect the electric power cable, above an upper end of the adjacent-side vertical plate.

7. The hybrid construction machine according to claim 1, further comprising an electric power cable which connects the motor-generator and the electric storage device, wherein the motor-generator is arranged to the rear of the device case, and the electric power cable is laid so as to pass through a gap between the device case and an adjacent-side vertical plate, of the two vertical plates, which is on a side adjacent to the device case, and so as to reach the motor-generator.

8. A hybrid construction machine, comprising:

a lower propelling body;

an upper frame which is provided so as to be able to slew on the lower propelling body;

an engine compartment which is provided in a rear portion of the upper frame;

a left and right pair of vertical plates which extend in a front/rear direction in an intermediate portion in a left/right direction of the upper frame;

a cabin which is provided in a space above the upper frame at a position on an outside of the both vertical plates in the left/right direction;

a work attachment having a base end section which is attached on a front portion of each of the vertical plates by a boom foot pin;

a motor-generator capable of operating as an electric motor and an electric generator;

an engine serving as a drive source for causing the motor-generator to operate as an electric generator;

an electric storage device which constitutes a power source for causing the motor-generator to operate as an electric motor, and which is charged by the motor-generator operating as an electric generator;

a slewing electric motor which drives the upper frame to slew by using the electric storage device as a power source;

a controller which controls operation of the motor-generator, the slewing electric motor and the electric storage device; and a device case which internally accommodates the electric storage device and the controller, wherein the device case is provided in a space above the upper frame, in a front portion of the upper frame and on an opposite side of the both vertical plates from the cabin, and constitutes up-and-down steps which are formed in a rearward-ascending step shape so as to be able to be ascended and descended, wherein the device case includes a cooling water inlet for introducing cooling water for cooling the electric storage device and the controller inside the device case, and a cooling water outlet for extracting the cooling water, and the cooling water inlet and the cooling water outlet being provided on a side surface of the device case which faces an adjacent-side vertical plate, of the two vertical plates, which is on a side adjacent to the device case, at positions distanced from the adjacent-side vertical plate when viewed from the side.

9. The hybrid construction machine according to claim 8, wherein the cooling water inlet and the cooling water outlet are arranged in separated fashion in a front portion and a rear portion of the device case, and the cooling water outlet is arranged at a higher position than the cooling water inlet.

\* \* \* \* \*